United States Patent [19]
Dulong et al.

[11] Patent Number: 6,163,764
[45] Date of Patent: Dec. 19, 2000

[54] EMULATION OF AN INSTRUCTION SET ON AN INSTRUCTION SET ARCHITECTURE TRANSITION

[75] Inventors: Carole Dulong; John H. Crawford, both of Saratoga, Calif.

[73] Assignee: Intel Corporation, Santa Clara, Calif.

[21] Appl. No.: 09/170,131

[22] Filed: Oct. 12, 1998

[51] Int. Cl.[7] ................................... G06F 9/455
[52] U.S. Cl. ..................... 703/26; 708/513; 710/66; 712/209; 712/227; 717/6; 717/7
[58] Field of Search ............................. 703/26; 708/513; 710/66; 712/23, 41, 209, 222, 226, 227; 717/4, 5, 6, 7, 8, 9

[56] References Cited

U.S. PATENT DOCUMENTS

| | | | |
|---|---|---|---|
| 4,951,195 | 8/1990 | Fogg, Jr. et al. | 703/20 |
| 5,313,614 | 5/1994 | Goettelmann et al. | 717/5 |
| 5,507,030 | 4/1996 | Sites | 717/4 |
| 5,574,927 | 11/1996 | Scantlin | 712/41 |
| 5,649,203 | 7/1997 | Sites | 717/9 |
| 5,652,889 | 7/1997 | Sites | 717/8 |
| 5,685,009 | 11/1997 | Blomgren et al. | 712/23 |
| 5,729,724 | 3/1998 | Sharangpani et al. | 712/222 |
| 5,740,093 | 4/1998 | Sharangpani | 708/513 |
| 5,764,959 | 6/1998 | Sharangpani et al. | 710/66 |
| 5,870,575 | 2/1999 | Kahle et al. | 712/209 |
| 5,920,721 | 7/1999 | Hunter et al. | 717/5 |

OTHER PUBLICATIONS

H. Barad et al., *Intel's Multimedia Architecture Expansion*, 19th Convention of Electrical and Electronics Engineers in Israel, 1996, pp. 148–151.

A. Peleg et al., *MMX Technology Extension to the Intel Architecture*, IEEE Micro, vol. 16 Aug. 4, 1996, pp. 42–50.

C. Dulong, *The IA–64 Architecture at Work*, Computer, vol. 31 Jul. 7, 1998, pp. 24–32.

A. Ferreira de Souza et al., *Dynamically Scheduling the Trace Produced During Program Execution into VLIW Instructions*, 13th International and 10th Symposium on Parallel and Distributed Processing, 1999 IPPS/SPDP Proceedings, pp. 248–257.

*Primary Examiner*—Kevin J. Teska
*Assistant Examiner*—Russell W. Frejd
*Attorney, Agent, or Firm*—Blakely, Sokoloff, Taylor & Zafman LLP

[57] ABSTRACT

A method and apparatus for emulating an instruction on a processor. The instruction operates on an operand in a first data format and the processor operates in a second data format. The operand is converted from the first data format to the second data format. The processor then executes the instruction in the second data format to generate a result in the second data format. The result is converted from the second data format to the first data format.

28 Claims, 9 Drawing Sheets

EMULATION OF AN INSTRUCTION SET ON AN INSTRUCTION SET ARCHITECTURE TRANSITION

BACKGROUND

1. Field of the Invention

This invention relates to computer systems. In particular, the invention relates to emulation of microprocessor instructions.

2. Description of Related Art

When a processor is improved to incorporate enhanced capabilities, it is important to maintain software compatibility with the applications developed in the previous model. One particular problem is the representation of data for logical and/or arithmetic operations.

For example, the floating-point (FP) number format has a single-precision (SP) and double-precision (DP) data formats. While the SP format is typically represented by a 32-bit representation, the DP format may have two different types of representation: a regular 64-bit format and an expanded 82-bit format. A regular processor typically uses the regular 64-bit FPDP format for operands stored both in its registers and in memory. An enhanced processor typically uses the expanded 82-bit FPDP format for operands stored in its registers and the regular 64-bit FPDP format for operands stored in the memory. For example, the Intel Architecture (IA) processors have a 32-bit model and an enhanced 64-bit model: the IA-32 processor and the IA-64 processor. The IA-32 processor uses the 64-bit FPDP format for operands stored in both registers and memory. The IA-64 processor uses the 64-bit FPDP format for memory operands and the expanded 82-bit FPDP format for register operands.

The transition from one instruction set operating with a regular data format to another instruction set operating with an enhanced data format is referred to as an instruction set architecture (ISA) transition. On such an ISA transition where an application program written using a regular mode of operation (e.g., 64-bit FPDP) is transported to a processor using the enhanced mode of operation (e.g., 82-bit FPDP), or vice versa, operand mismatches may occur. Such mismatches cause performance degradation and in many cases may cause software incompatibility.

Therefore, there is a need in the technology to provide a method to emulate an instruction set for one data format on a processor that operates in an expanded data format.

SUMMARY

The invention is a method and apparatus for emulating an instruction on a processor. The instruction operates on an operand in a first data format and the processor operates in a second data format. The operand is converted from the first data format to the second data format. The processor then executes the instruction in the second data format to generate a result in the second data format. The result is converted from the second data format to the first data format.

BRIEF DESCRIPTION OF THE DRAWINGS

The features and advantages of the present invention will become apparent from the following detailed description of the present invention in which.

DESCRIPTION

The invention is a method and apparatus for emulating instructions operating in one data format representation on a processor having another data format representation. The technique involves a number of embodiments. A tagged architecture provides tag bits to be associated with each register. Various schemes for converting the data representations are provided. Code patching with jump instruction to jump to appropriate code is used in mode transitions or context switches. Convert instructions convert the data representations between integer and floating-point numbers for arithmetic and logical instructions. The invention provides software compatibility between a processor architecture and an enhanced processor architecture.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
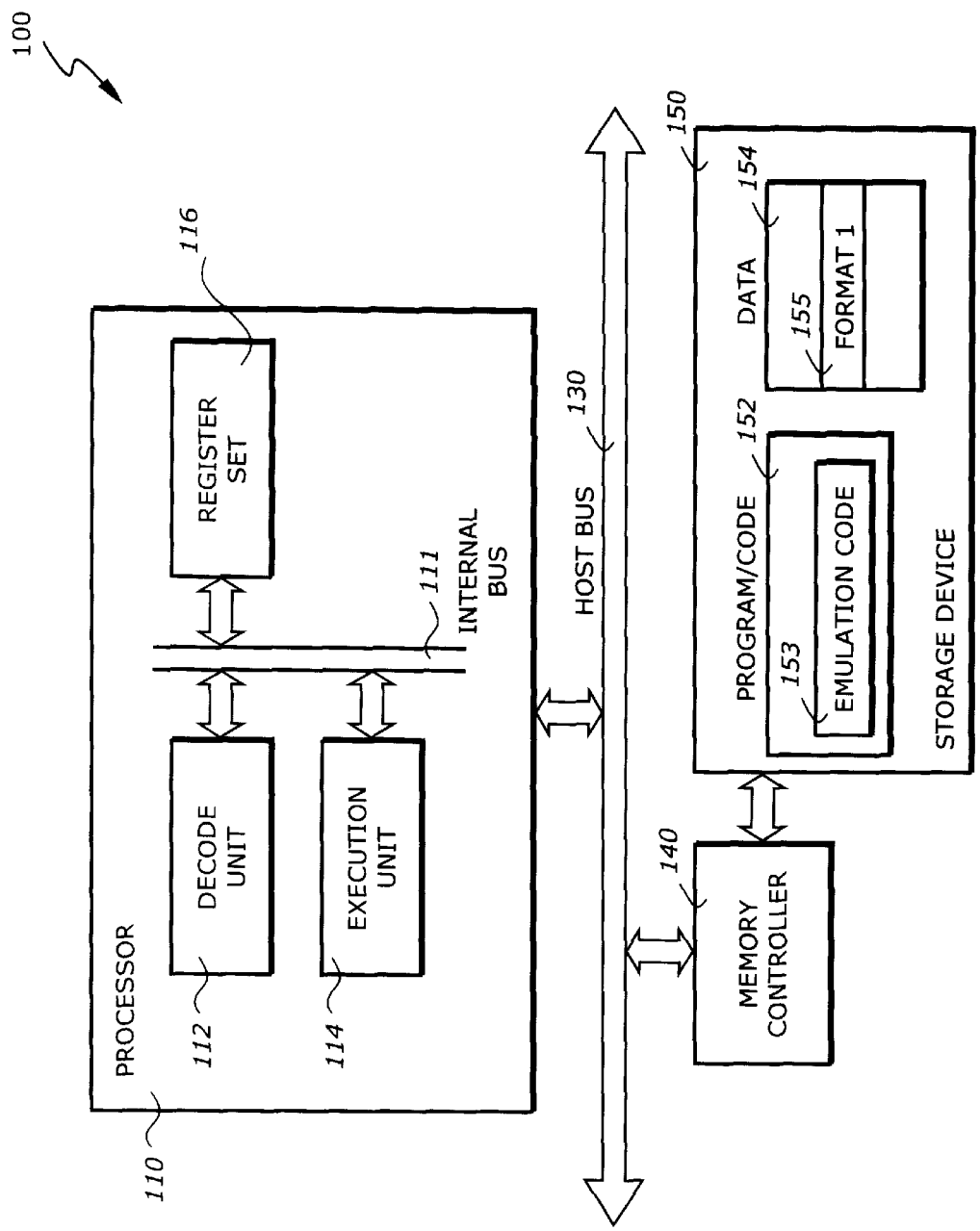
FIG. 1 is a diagram illustrating a computer system in which one embodiment of the invention can be practiced.

FIG. 1 is a diagram illustrating a computer system in which one embodiment of the invention can be practiced. The computer system 100 includes a processor 110, a host bus 120, a memory controller 130, and a storage device 150.

The processor 110 represents a central processing unit of any type of architecture, such as complex instruction set computers (CISC), reduced instruction set computers (RISC), very long instruction word (VLIW), or hybrid architecture. While this embodiment is described in relation to a single processor computer system, the invention could be implemented in a multi-processor computer system.

The memory controller 140 provides various access functions to the storage device 150. The memory controller 140 is coupled to the host bus 130 to allow the processor to access the storage device 150. The storage device 150 represents one or more mechanisms for storing information. For example, the storage device 150 may include non-volatile or volatile memories. Examples of these memories include flash memory, read only memory (ROM), or random access memory (RAM).

FIG. 1 also illustrates that the storage device 150 has stored therein program code 152 and data 154. The program code 152 represents the necessary code for performing any and/or all of the techniques in the present invention. In particular, the program code 152 includes an emulation code 153. The emulation code 153 emulates instructions in one data format (or mode) on the processor 110. The data 154 stores data used by the program code 152, graphics data and temporary data. In particular the data memory 154 includes a data segment 155 which contains data represented in a format 1, referred to as a memory format or expanded format. Of course, the storage device 150 preferably contains additional software (not shown), which is not necessary to understanding the invention.

FIG. 1 additionally illustrates that the processor 110 includes a decode unit 112, an execution unit 114, a register set 116, and an internal bus 111. Of course, the processor 110 contains additional circuitry, which is not necessary to understanding the invention. The decode unit 112 is used for decoding instructions received by processor 110 into control signals and/or microcode entry points. In response to these control signals and/or microcode entry points, the execution unit 114 performs the appropriate operations. The register set 116 includes a number of registers that store data represented in a format 2, referred to as register format.

In one embodiment, the processor 110 is an Intel Architecture-64 (IA-64) processor. The IA-64 is a 64-bit processor processing 64-bit data. In the IA-64, 64-bit floating-point double-precision (FP DP) numbers are represented as 82-bit FP DP in the register set 116 (expanded or register format), but 64-bit FP DP in the memory 155 (regular or memory format). A 32-bit processor (e.g., IA-32) represents a 64-bit FP DP numbers as 64-bit FP DP format in both its registers and memory, referred to as regular format. To maintain software compatibility when porting programs developed for a 32-bit processor (e.g., IA-32) to a 64-bit processor (e.g., IA-64), some translation or conversion is necessary. The technique in the present invention can be used to emulate the 32-bit instructions on the 64-bit processor. In the following discussion, the processor 110 is referred to as a platform processor and the programs or software written using the 32-bit instruction set is referred to as a porting programs or software.

The emulation may be implemented in a number of ways. One way involves a slight hardware modification on the platform processor. Other ways involve conversions of the data formats by patching code to the porting programs.

The computer program or software implementing the techniques described in the present invention may be stored and/or transmitted in a machine readable medium. Examples of such machine readable medium include semiconductor memories such as random access memory (RAM), read only memory (ROM), erasable ROM (EROM), flash memory, magnetic medium, compact disk read only memory (CDROM), floppy diskette, hard disk, optical disk, signals, carrier waves, etc. The computer program or the code sequence emulates the instruction which operates on at least one operand in a first data format while the processor operates in a second data format. The computer program or the code sequence includes a number of code segments, sub-programs, sub-routines, or functions to perform a number of operations. Examples of these operations include converting the operand from the first data format to the second data format, executing the instruction by the processor in the second data format to generate a result in the second data format, converting the result from the second data format to the first data format. Additional code segments are used to perform other functions as explained further in the following.

Figure 2:
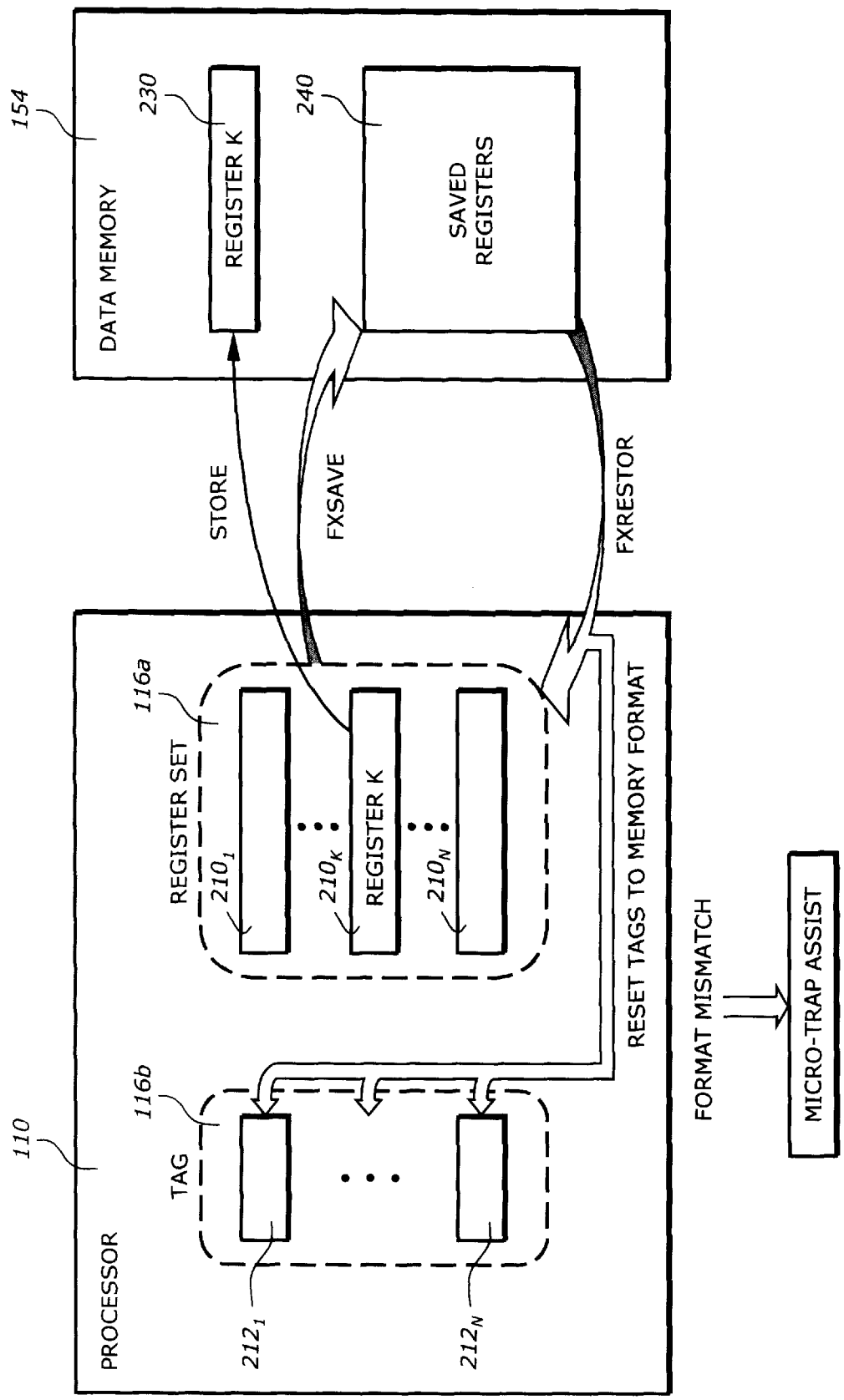
FIG. 2 is a diagram illustrating a tagged architecture according to one embodiment of the invention.

FIG. 2 is a diagram illustrating a tagged architecture according to one embodiment of the invention. The tagged architecture includes a tag structure to be associated with the register set.

As shown in FIG. 2, the processor 110 includes a register set 116*a* and a corresponding tag set 116*b*. The register set 116*a* includes N registers 2101 to 210N. The tag set 116*b* includes N tags 2121 to 212N corresponding to the N registers 2101 to 210N, respectively.

Each of the tags 2121 to 212N stores a tag bit to indicate the format of corresponding register. For example, the tag bit may be 0 to indicate that the register format is 64-bit regular format and 1 to indicate the register format is 82-bit expanded format. As is known by one skilled in the art, other bit patterns can be used. The tag set provides a means to detect if there is a format mismatch between the operation and the operands. A detection logic circuit can be implemented to compare the operation type with the corresponding tag bits. When there is a format mismatch, a trap can be invoked to direct control to a micro-routine to change the format of the operands. A format mismatch does not occur often. Therefore the latency incurred by the micro-trap assist is acceptable.

In all stores from registers to memory, the format is changed from expanded format to memory format. FIG. 2 illustrates a store instruction moves contents of register K 210K to memory 230.

In a context switch, register set 116*a* is saved in memory as saved registers 240 by a save instruction (e.g., FXSAVE) and restored by a restore instruction (e.g., FXRESTOR). The format is converted on the first use of data when the operation and operand formats mismatch. The tag set 116*b* is not saved by the save instruction. The tags are reset to indicate memory format on a restore.

Figure 3:
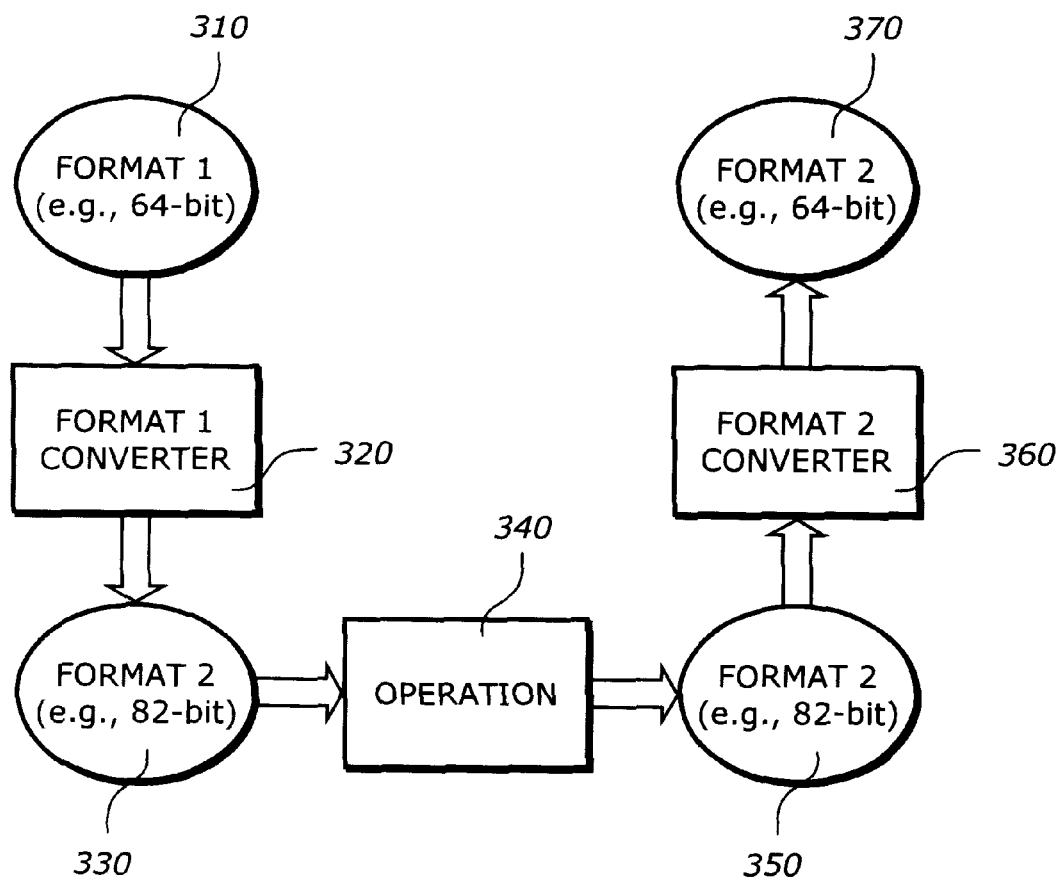
FIG. 3 is a diagram illustrating a format conversion according to one embodiment of the invention.

FIG. 3 is a diagram illustrating a format conversion according to one embodiment of the invention. The format conversion method converts the 64-bit format to the 82-bit format before all operations and 82-bit format to the 64-bit format after all operations. The format conversion includes a format 1 converter 320, format 2 converter 360, and an operation 340.

FIG. 3 shows operands 310, 330, 350 and 370. Operands 310 and 370 are in format 1 (e.g., 64-bit) and operands 330 and 350 are in format 2 (e.g., 82-bit). The format 1 converter converts operands 310 from the format 1 to operands 330 in format 2 before the operation. The operation 340 is performed using format 2. After the operation, operands 350 are converted back to operands 370 in format 1 by the format 2 converter 360.

Figure 4:
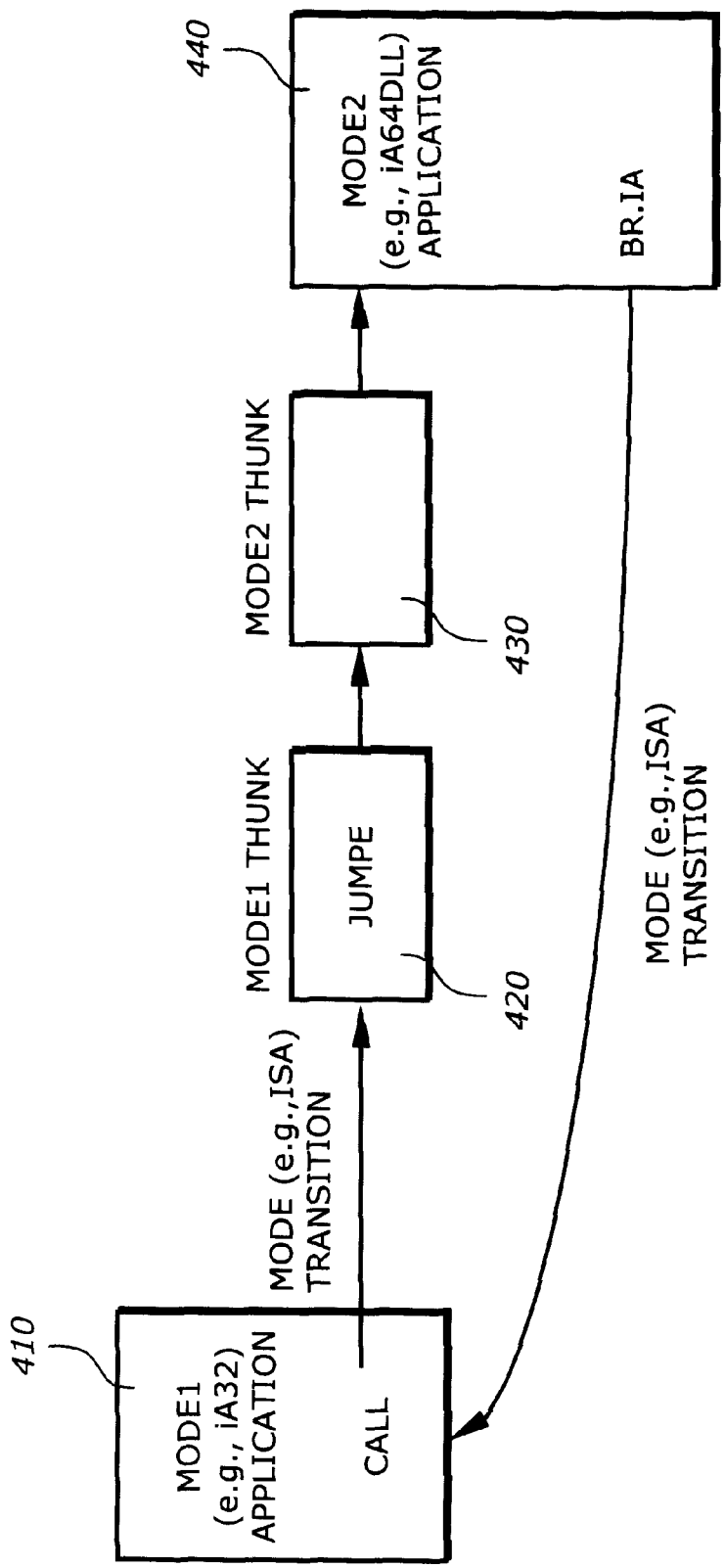
FIG. 4 is a diagram illustrating a mode transition according to one embodiment of the invention.

FIG. 4 is a diagram illustrating a mode transition according to one embodiment of the invention. A mode transition (e.g., ISA transition) occurs when an application running in a first mode (e.g., IA-32) calls to an application in a second mode (e.g., IA-64).

A mode transition involves a model application 410, a model domain 420, a mode2 domain 430, and a mode2 application 440. The model application 410 calls to the mode2 application 440. The mode2 application 440 does not know about the model format (e.g., register format). The model domain 420 provides a jump to the mode2 by a jump instruction (e.g., JUMPE). The mode2 domain 430 provides the mode2 conversion of parameters. Then the operation takes place in the mode2 application 440.

Upon mode transition from mode2 application 440 to model application 410, a branch instruction (e.g., BR_IA) provides an exit from the mode2 application 440 to the model application 410.

In the model application 410, the double precision data may be represented in memory or expanded format in registers. In the model domain 420, all the registers in the model application 410 are saved in memory. The mode2 domain 430 loads the parameters from the memory with the format according to the usage. In the mode2 application 440, the double precision data is converted to expanded format in registers. After the operation in mode2 application, the branch instruction passes the result parameters in memory to the mode1 application 410.

Figure 5:
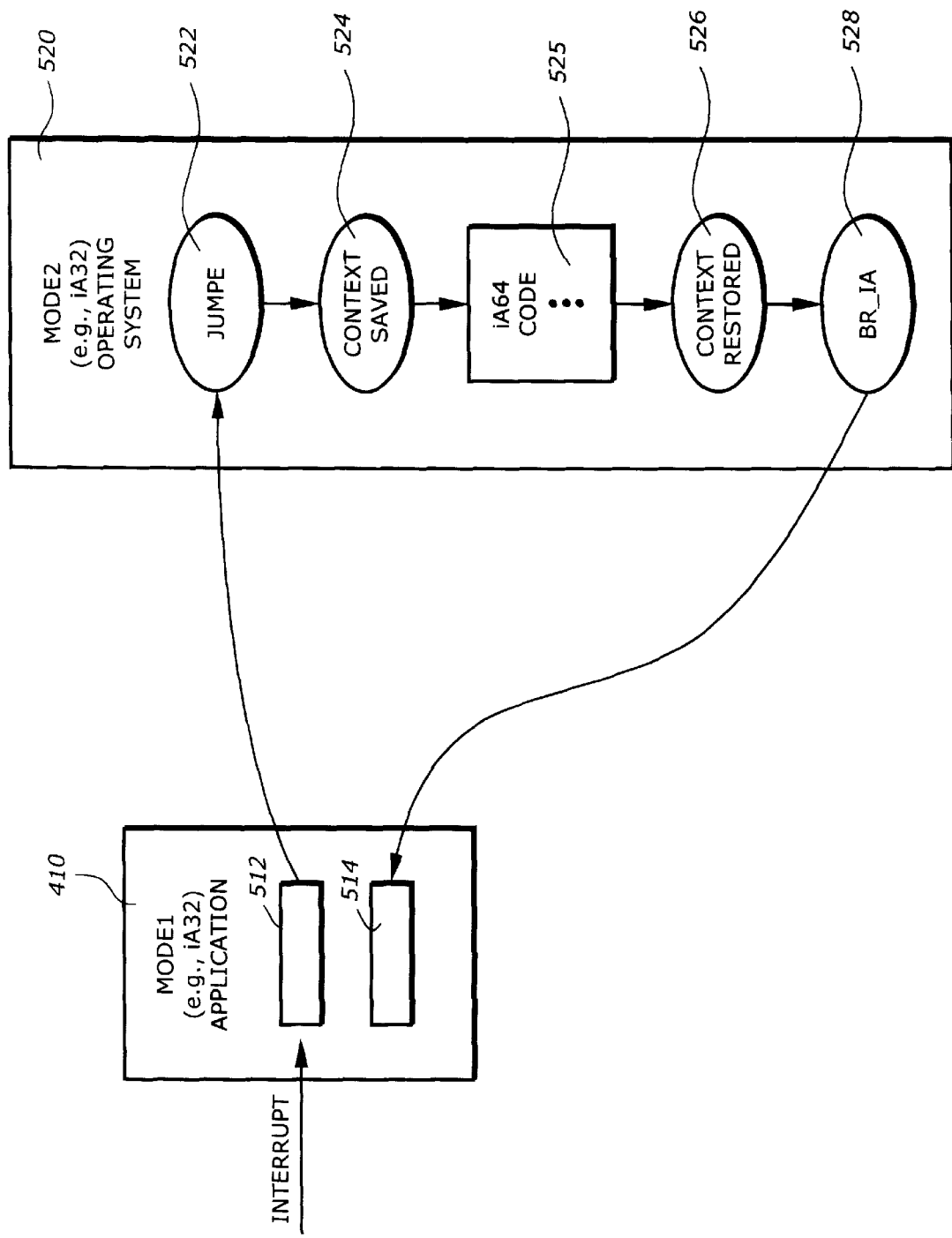
FIG. 5 is a diagram illustrating a context switch according to one embodiment of the invention.

FIG. 5 is a diagram illustrating a context switch 500 according to one embodiment of the invention. The context switch 500 occurs due to an interrupt and involves a mode1 application 410 and a mode2 operating system 520. As is known by one skilled in the art, other causes for the context switch are possible such as process swapping, multitasking, etc.

The mode1 application is an application running in mode 1 instruction set (e.g., IA32). The model application 410 includes a calling code 512 and a return code 514. The mode2 operating system (OS) 520 is an operating system running in mode 2 instruction set (e.g., IA64). The mode2 OS 520 includes a patch code 522, a save code 524, a mode2 code 525, a restore code 526, and a return code 528.

In the context switch 500 illustrated in FIG. 5, the model application 410 receives an interrupt. The registers in the model application 410 are in memory and expanded formats. The calling code 512 call to the mode2 OS 520. As control passes to the mode2 OS 520, the patch code 522 performs a transition to go from the emulation mode to the native mode by executing a patching instruction such as a JUMPE instruction. All registers are converted to the memory format on the patching instruction. The save code 524 saves all the model registers as bits with a bit store instruction. A bit store instruction (e.g., STF.SPILL) stores the contents of the registers without conversion. For example, the IA32 FP registers are stored in the memory as 16 bytes without conversion.

Then the mode2 code 525 proceeds with the execution of the mode 2 instruction set (e.g., IA64) to service the interrupt or other tasks as appropriate. After the mode2 code 525 completes its execution, the restore code 526 restores the saved model registers as bits with a bit restore instruction. A bit restore instruction (e.g., LDF.FILL) restores the register bits stored in memory by the bit store instruction to the registers. For example, the IA32 FP registers are restored with the 16 bytes from memory without conversion. Then the return code 528 causes an ISA transition to return to the model application by executing a branch instruction (e.g., BR_IA). On returning to the return code 514 in the model application 410, all registers are restored in memory format. If a tagged architecture is used, all internal tags are reset to memory format. The return code 514 in the model application 410 continues its operation in the model environment.

Figure 6:
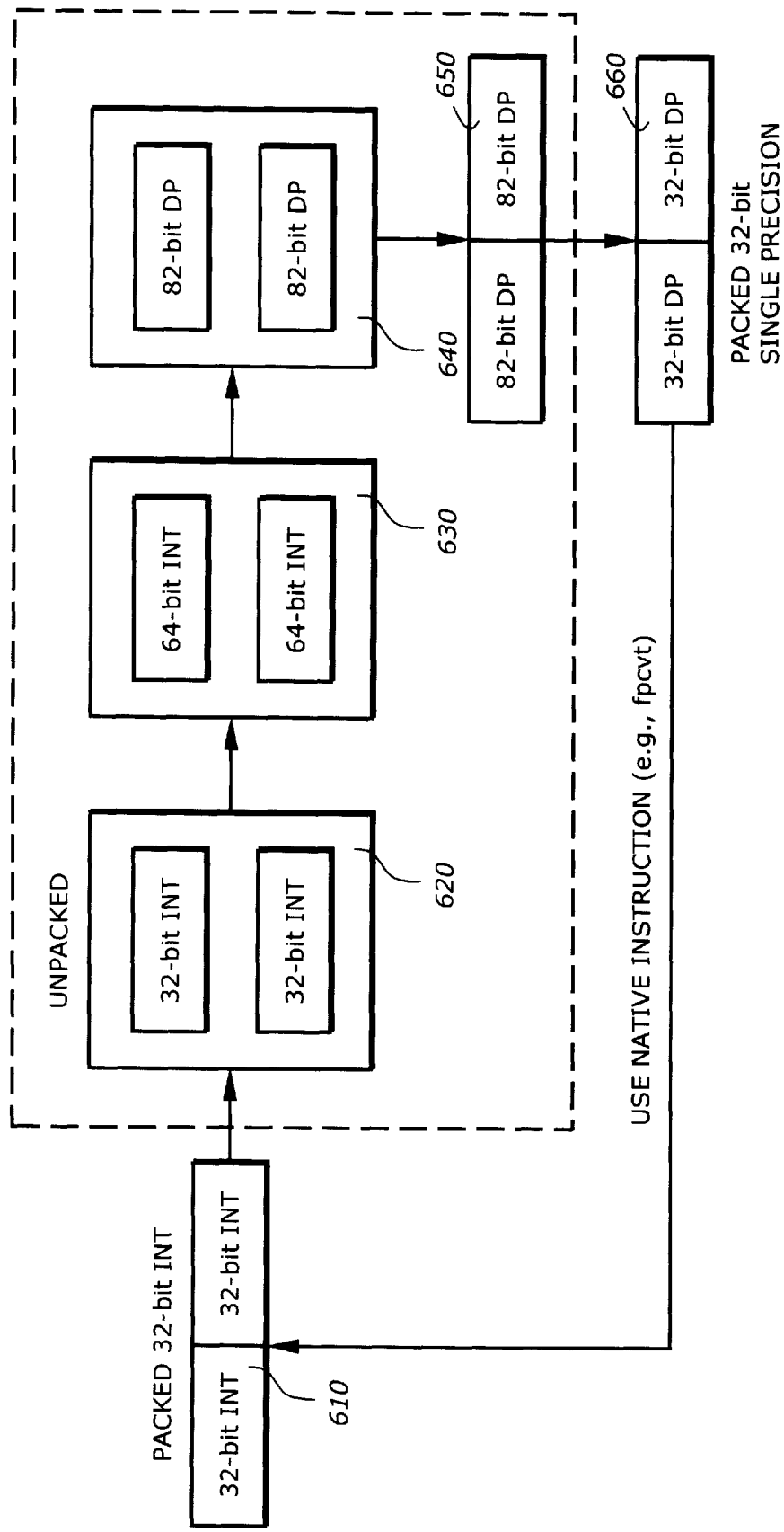
FIG. 6 is a diagram illustrating a number format conversion according to one embodiment of the invention.

FIG. 6 is a diagram illustrating a number format conversion according to one embodiment of the invention. The number format conversion converts a packed 32-bit integer (INT) item 610 to a packed 32-bit single precision (SP) item 660, and vice versa. The packed 32-bit INT item 610 is converted to the packed 32-bit SP item 660 by the convert sequence 605. The packed 32-bit SP item 660 is converted to the packed 32-bit INT item 610 by using native convert instructions such as the fpcvt instruction.

The convert sequence 605 converts the packed 32-bit INT item 610 to an unpacked 32-bit INT item 620 by unpacking the item 610 into two separate parts, each part is a 32-bit INT item. Then the unpacked 32-bit INT item 620 is converted to an unpacked 64-bit INT item 630 by converting each 32-bit INT item into a corresponding 64-bit INT item. Then the unpacked 64-bit INT item 630 is converted to an unpacked 82-bit DP item 640 by converting each 64-bit INT item into a corresponding 82-bit DP item. The unpacked 82-bit DP item 640 is then converted to a packed 82-bit DP item 650 by packing or combining the 82-bit DP items into a packed format. Finally, the packed 82-bit DP item 650 is converted to the 32-bit DP item 660.

Figure 7:
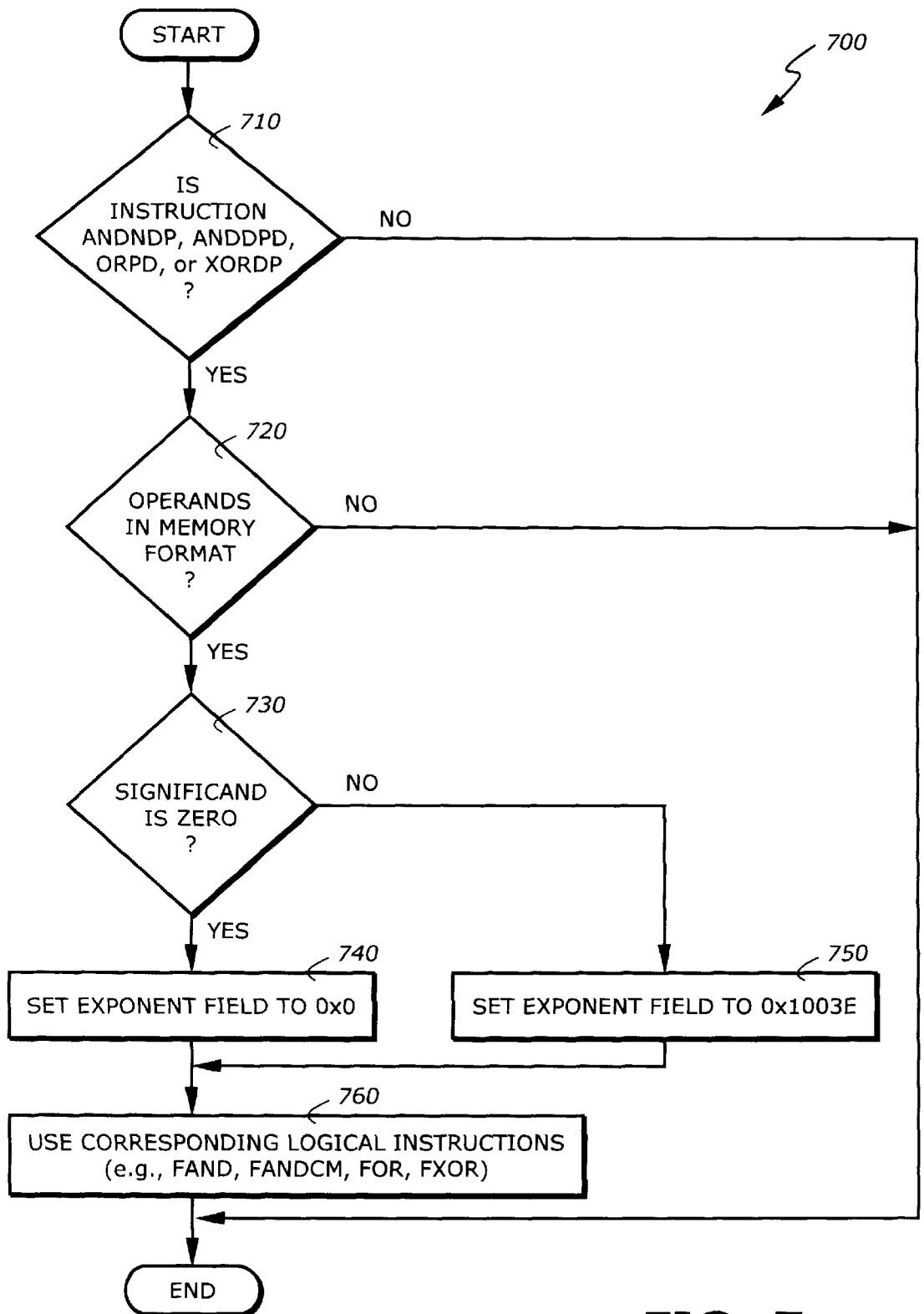
FIG. 7 is a diagram illustrating a process to emulate logical instructions according to one embodiment of the invention.

FIG. 7 is a diagram illustrating a process 700 to emulate logical instructions according to one embodiment of the invention.

Upon START, the process 700 determines if the instruction is a logical double precision (DP) instruction such as ANDNDP, ANDDPD, ORDP, XORDP (Block 710). If not, the process 700 is terminated. If the instruction is one of the logical DP instructions, the process 700 next determines if the operands are in the memory format (Block 720). If not, the process 700 is terminated. If the operands are in the memory format, the process 700 determines if the significand is zero (Block 730). If not, the process 700 sets the exponent field to 0x1003E (Block 750) and proceeds to perform the logical operation (Block 760). If the significand is zero, the process 700 sets the exponent field to 0x0 (Block 740) and proceeds to perform the corresponding logical operation (Block 760) such as FAND, FANDCM, FOR, or FXOR.

Figure 8:
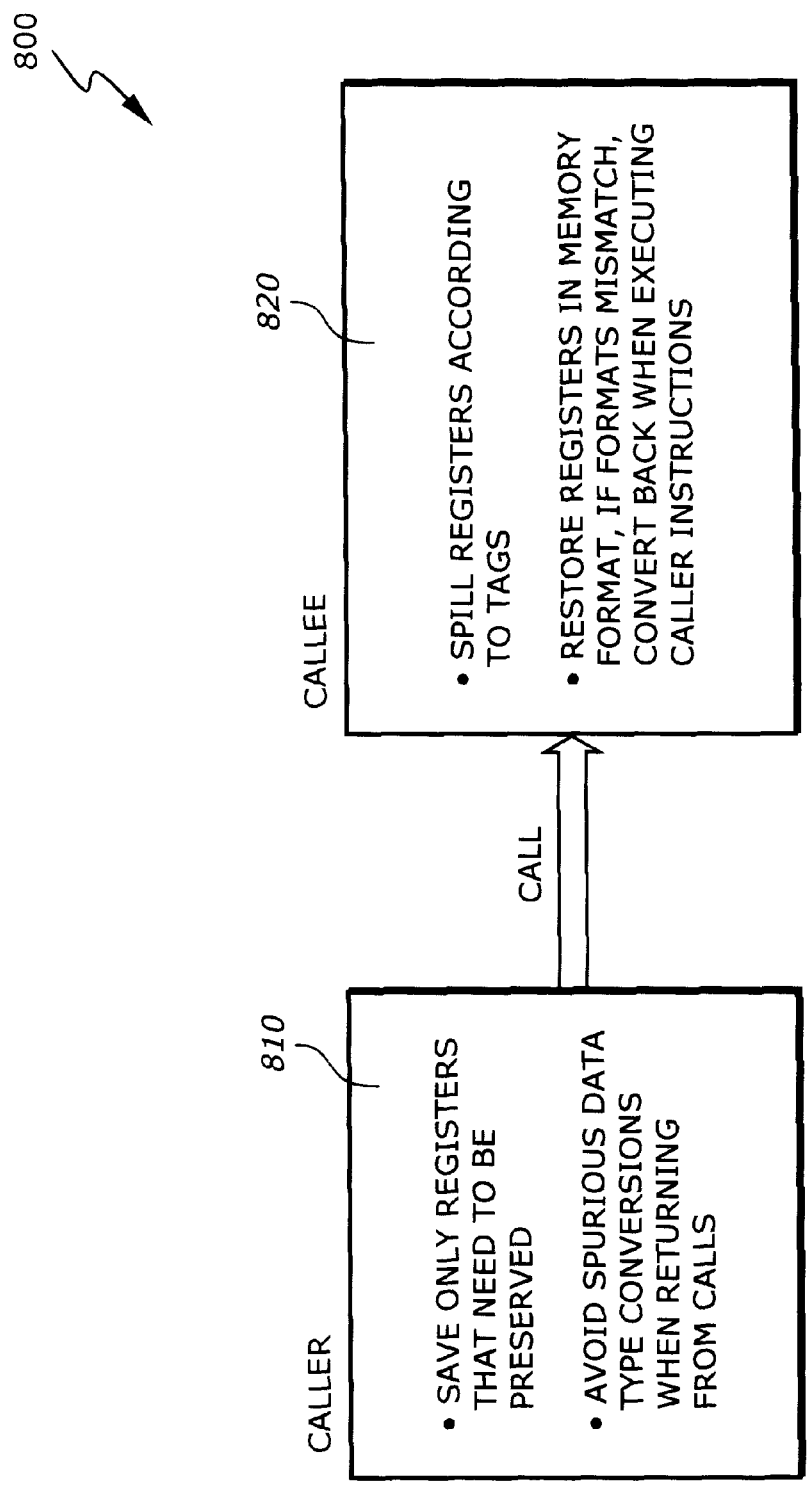
FIG. 8 is a diagram illustrating a calling operation according to one embodiment of the invention.

FIG. 8 is a diagram illustrating a calling operation 800 according to one embodiment of the invention. The calling operation 800 includes a caller 810 and a callee 820.

The caller 810 runs the application in one data format and calls the callee 820. The callee 820 runs the application in another data format. The caller knows the usage of its registers and therefore saves only the registers that need to be preserved before calling the callee 820. The callee 820 spill the registers according to the tag bits by storing the registers as bits in the memory. After the operation, the callee 820 restores the register bits saved in the memory in memory format. If there is format mismatch, the callee 820 converts back when executing the caller instructions. Upon returning to the caller 810, the caller avoids spurious data type conversions.

Figure 9:
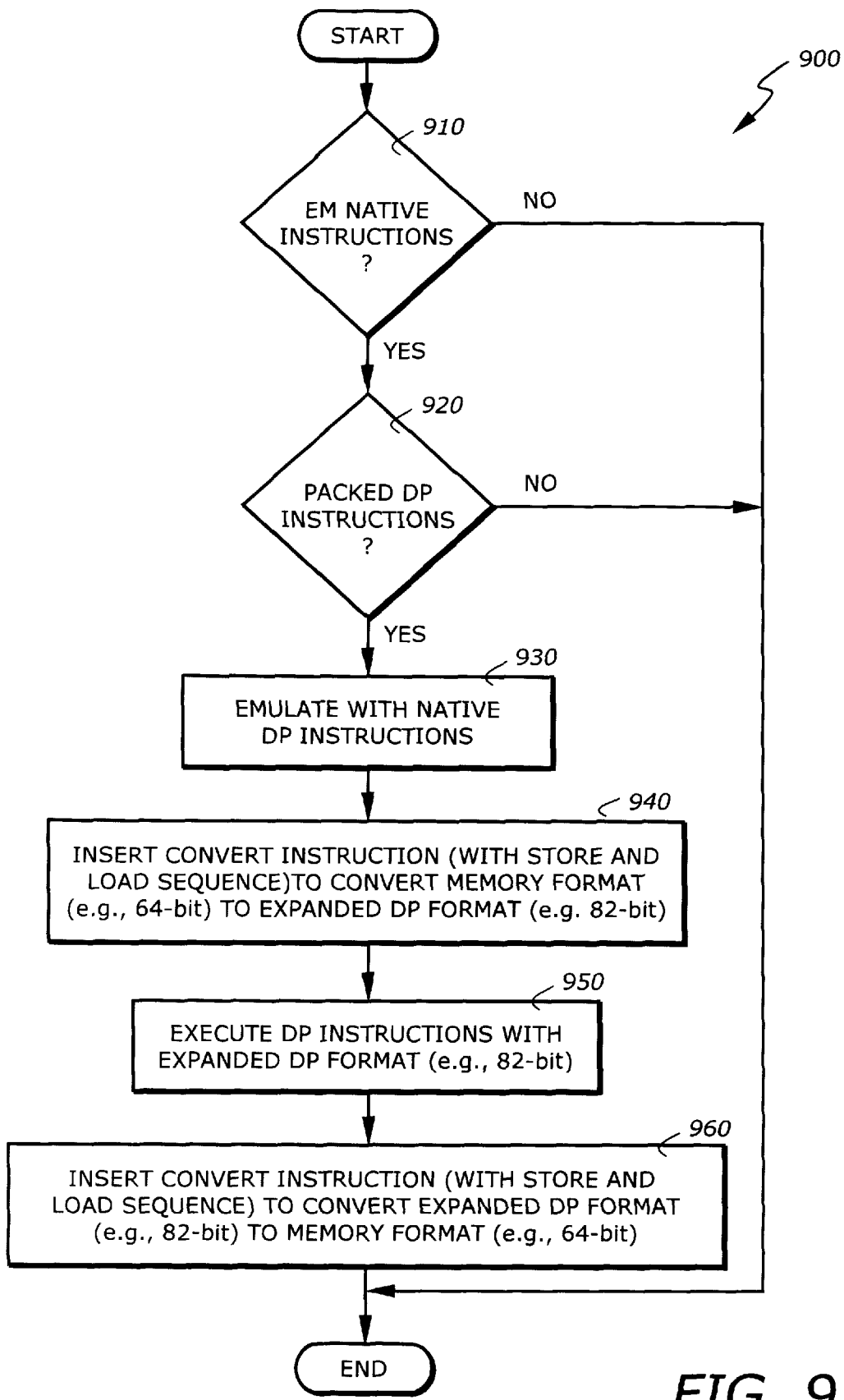
FIG. 9 is a flowchart illustrating a process for an object code translation (OCT) according to one embodiment of the invention.

FIG. 9 is a flowchart illustrating a process 900 for an object code translation (OCT) according to one embodiment of the invention.

Upon START, the process 900 determines if the instruction is an enhanced mode (EM) native instruction (Block 910). If not, the process 900 is terminated. If the instruction is an EM native instruction, the process 900 determines if it is one of the packed DP instructions (Block 920). If not, the process 900 is terminated. If the instruction is a packed DP instruction, the process 900 emulates the instruction with the corresponding native DP instruction (Block 930). The process 900 inserts an appropriate convert instruction to convert the memory format (e.g., 64-bit DP) to the expanded DP format (e.g., 82-bit DP). The convert instruction typically includes a store and load sequence.

Next, the process 900 executes the DP instructions with the expanded DP format (e.g., 82-bit DP) (Block 950). After the execution, the process 900 inserts a convert instruction to convert the expanded DP format (e.g., 82-bit) to the memory format (e.g., 64-bit). Again, the convert instruction typically includes a store and load sequence. The process 900 is then terminated.

The present invention provides techniques to emulate a double precision instruction set on a processor which has an expanded precision format representation. The techniques include format conversion, context switching, tagged architecture, calling conventions, and convert instructions.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for emulating an instruction on a processor, comprising:
    converting an operand of an instruction from a first data format to a second data format, the first and second data formats corresponding to first and second instruction set architectures, respectively;
    executing the instruction using the second instruction set architecture to generate a result in the second data format; and
    converting the result from the second data format to the first data format.

2. The method of claim 1 wherein converting the operand from the first data format to the second data format comprises converting the operand from a double-precision floating-point (DPFP) format.

3. The method of claim 2 wherein converting the operand from the first data format to the second data format comprises converting the operand to an expanded double-precision floating-point (EDPFP) format.

4. The method of claim 3 wherein the DPFP format has a 64-bit representation.

5. The method of claim 4 wherein the EDPFP format has an 82-bit representation.

6. The method of claim 5 wherein the 64-bit DPFP format is used in memory and the 82-bit EDPFP format is used in registers of a processor having the second instruction set architecture.

7. The method of claim 6 further comprising associating a tag bit to one of the registers of the processor to indicate if the register is in one of the first and second data formats.

8. The method of claim 7 wherein converting the operand from the first data format to the second data format comprises converting the operand from the first data format to the second data format if there is a mismatch between the tag bit and the corresponding instruction.

9. The method of claim 8 further comprising storing contents of one of the registers in the memory in the second data format.

10. The method of claim 9 further comprising saving contents of registers in the memory in the second data format when there is a save operation on a context switch.

11. The method of claim 10 further comprising restoring the saved contents of registers from the memory to the registers in the second data format when there is a restore operation on a context switch.

12. A machine readable medium having embodied thereon a computer program for processing by a processor to emulate an instruction on the processor, the computer program comprising:
    a computer readable program code to convert an operand of an instruction from a first data format to a second data format, the first and second data formats corresponding to first and second instruction set architectures, respectively;
    a computer readable program code to execute the instruction using the second instruction set architecture to generate a result in the second data format; and
    a computer readable program code to convert the result from the second data format to the first data format.

13. The machine readable medium of claim 12 wherein the first data format is a double-precision floating-point (DPFP) format.

14. The machine readable medium of claim 13 wherein the second data format is an expanded double-precision floating-point (EDPFP) format.

15. The machine readable medium of claim 14 wherein the DPFP format has a 64-bit representation.

16. The machine readable medium of claim 15 wherein the EDPFP format has an 82-bit representation.

17. The machine readable medium of claim 16 wherein the 64-bit DPFP format is used in memory and the 82-bit EDPFP format is used in registers of a processor having the second instruction set architecture.

18. The machine readable medium of claim 17 wherein the computer program further comprises a computer readable program code to associate a tag bit to one of the registers of the processor to indicate if the register is in one of the first and second data formats.

19. The machine readable medium of claim 18 wherein the computer readable program code to convert the operand from the first data format to the second data format comprises computer readable program code to convert the operand from the first data format to the second data format if there is a mismatch between the tag bit and the corresponding instruction.

20. The machine readable medium of claim 19 wherein the computer program further comprises a computer readable program code to store contents of one of the registers in the memory in the second data format.

21. The machine readable medium of claim 20 wherein the computer program further comprises a computer readable program code to save contents of registers in the memory in the second data format when there is a save operation on a context switch.

22. The machine readable medium of claim 21 wherein the computer program further comprises a computer readable program code to restore the saved contents of registers from the memory to the registers in the second data format when there is a restore operation on a context switch.

23. A system comprising:
    a processor; and
    a memory coupled to the processor, the memory storing a code sequence that causes the processor to emulate an instruction executed by the processor, the code sequence comprising:
        a code segment to convert an operand of an instruction from a first data format to a second data format, the first and second data formats corresponding to first and second instruction set architectures, respectively
        a code segment to execute the instruction using the second instruction set architecture to generate a result in the second data format, and
        a code segment to convert the result from the second data format to the first data format.

24. The system of claim 23 wherein the code sequence further comprises a code segment to associate a tag bit to one of the registers of the processor to indicate if the register is in one of the first and second data formats.

25. The system of claim 24 wherein the the code segment to convert the operand from the first data format to the second data format comprises a code segment to convert the operand from the first data format to the second data format if there is a mismatch between the tag bit and the corresponding instruction.

26. The system of claim 25 wherein the code sequence further comprises a code segment to store one of the registers in the memory in the second data format.

27. The system of claim 26 wherein the code sequence further comprises a code segment to save contents of registers in the memory in the second data format when there is a save operation on a context switch.

28. The system of claim 27 wherein the code sequence further comprises a code segment to restore the saved contents of registers from the memory to the registers in the second data format when there is a restore operation on a context switch.

\* \* \* \* \*